United States Patent
Chang et al.

(10) Patent No.: US 10,708,498 B2
(45) Date of Patent: Jul. 7, 2020

(54) VIDEO TAKING DEVICE WITH AUXILLARY CONTROLLER AND MAIN CONTROLLER, AND OPERATION METHOD THEREOF

(71) Applicant: GIGA-BYTE TECHNOLOGY CO., LTD., New Taipei (TW)

(72) Inventors: Chih-Liang Chang, New Taipei (TW); Hung-Ta Chen, New Taipei (TW); Yu-Chia Hsu, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/010,424

(22) Filed: Jun. 16, 2018

(65) Prior Publication Data

US 2019/0191085 A1   Jun. 20, 2019

(30) Foreign Application Priority Data

Dec. 26, 2017   (TW) .............................. 106145642 A

(51) Int. Cl.
*H04N 5/232* (2006.01)
*G01S 11/00* (2006.01)

(52) U.S. Cl.
CPC .......... *H04N 5/23245* (2013.01); *G01S 11/00* (2013.01); *H04N 5/232* (2013.01); *H04N 5/232411* (2018.08)

(58) Field of Classification Search
CPC ............... H04N 5/23245; H04N 5/232; H04N 5/232411; G01S 11/00
See application file for complete search history.

(56) References Cited

U.S. PATENT DOCUMENTS

| | | | | |
|---|---|---|---|---|
| 5,255,046 A | * | 10/1993 | Kawasaki | ............ G03B 7/0807 396/155 |
| 2009/0303342 A1 | * | 12/2009 | Corcoran | ........... H04N 5/23219 348/222.1 |
| 2015/0172539 A1 | * | 6/2015 | Neglur | ............... H04N 5/23206 348/207.1 |
| 2017/0223279 A1 | * | 8/2017 | Mueller | ............... H04N 9/3179 |
| 2018/0241922 A1 | * | 8/2018 | Baldwin | .............. H04N 5/2259 |

* cited by examiner

*Primary Examiner* — Gevell V Selby
(74) *Attorney, Agent, or Firm* — Maschoff Brennan

(57) ABSTRACT

A video taking device comprises a video camera, an auxiliary controller and a main controller, wherein the video camera is electrically connected with the auxiliary controller and the main controller and the auxiliary controller is electrically connected with the main controller. The video camera is configured to film to generate a video stream. The auxiliary controller is configured to determine whether there is a target existing in the video stream, and to generate a switch instruction when the target exists in the video stream. The main controller is configured to switch into a first operation mode from a first standby mode and instruct the auxiliary controller to be in a second standby mode when receiving the switch instruction, and to obtain the video stream from the video camera for recognizing appearance of the target.

10 Claims, 5 Drawing Sheets

1

VIDEO TAKING DEVICE WITH AUXILLARY CONTROLLER AND MAIN CONTROLLER, AND OPERATION METHOD THEREOF

CROSS-REFERENCE TO RELATED APPLICATIONS

This Non-Provisional Application claims priority under 35 U.S.C. § 119(a) on Patent Application Ser. No(s). 106145642 filed in Taiwan, R.O.C on Dec. 26, 2017, the entire contents of which are hereby incorporated by reference.

BACKGROUND

Technical Field

This disclosure relates to a video taking device, and more particularly to a video taking device having a video controller.

Related Art

Video image detection (VID) technology is performed by inputting an image into an analytical instrument for image recognition, and determining whether there is a target exists or a target event occurs in the image. For example, in a VID system, a flame, smoke or an intruder can be set as the target, and an alarming device can be triggered when the target is recognized by an analyzer after it is shot.

With the development of VID technology, the recognition technology applied to three-dimensional images is gradually developed to obtain more accurate recognition results. However, the capture and recognition of three-dimensional images require a large amount of computation, so a video controller in the VID system must be in high-speed operation at any time. In other words, the capture and recognition of three-dimensional images consume considerable power and simultaneously produce a lot of heat which may easily damage the internal components of the VID system or may cause the VID system to operate in error.

SUMMARY

According to one or more embodiments of this disclosure, a video taking device may include a video camera, an auxiliary controller and a main controller. The video camera may be electrically connected with the auxiliary controller and the main controller; and the auxiliary controller may be electrically connected with the main controller. The video camera may be configured to film to generate a video stream. The auxiliary controller may be configured to determine whether there is a target existing in the video stream, and to generate a switch instruction when the target exists in the video stream. The main controller may be configured to switch into a first operation mode from a first standby mode and instruct the auxiliary controller to be in a second standby mode when receiving the switch instruction, and to obtain the video stream from the video camera for recognizing appearance of the target.

According to one or more embodiments of this disclosure, an operation method is applied to a video taking device comprising a video camera, an auxiliary controller and a main controller. The operation method may include: filming a preset region to generate a video stream by the video camera; determining whether a target exists in the video stream, and generating a switch instruction when the target exists in the video stream by the auxiliary controller; instructing the main controller to switch into a first operation mode from a first standby mode and instructing the auxiliary controller to switch into a second standby mode from a second operation mode when the main controller receives the switch instruction; and obtaining the video stream from the video camera for recognizing appearance of the target obtained by the main controller in the first operation mode.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
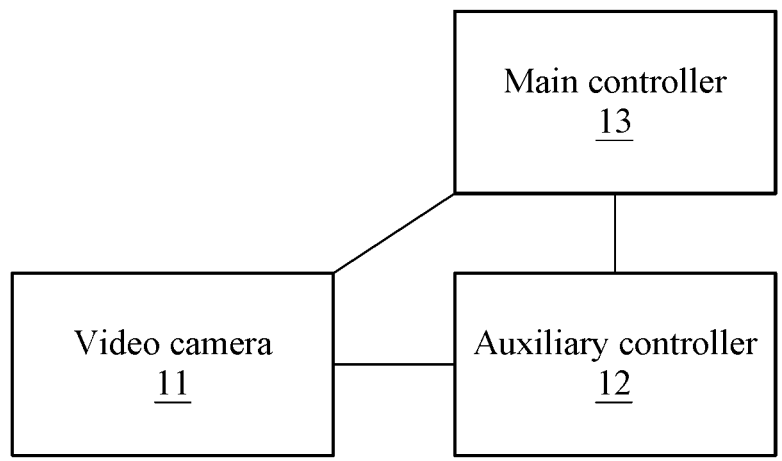
FIG. 1 is a functional block diagram of a video taking device according to an embodiment of this disclosure.

Please refer to FIG. 1 which is a functional block diagram of a video taking device according to an embodiment of this disclosure. In FIG. 1, the video taking device 1 comprises a video camera 11, an auxiliary controller 12 and a main controller 13. The auxiliary controller 12 is electrically connected with the video camera 11 and the main controller 13, and the main controller 13 is electrically connected with the video camera 11. The video camera 11 is configured to film to generate a video stream. More specifically, the video camera 11 may be a depth-sensing camera for example, and can film the scene to obtain its gray level image information and three-dimension information containing depth distribution information. The operational mechanism of the depth-sensing camera may include: emitting a reference beam to a region to be detected, obtaining the depth distribution information of the region to be detected based on time difference or phase difference between reflected beam and the reference beam, and obtaining two-dimensional image information of the region to be detected by being combined with a conventional two-dimensional camera. The operational mechanism of the depth-sensing camera can be implemented by structured light, time of flight (ToF) or binocular stereo imaging. In this embodiment, a ToF camera is particularly served as the video camera 11.

The auxiliary controller 12, which may be a micro control unit (MCU) for example, can be electrically connected with the video camera 11 via a synchronous serial interface (SSI) and an inter-integrated circuit ($I^2C$) bus. The auxiliary controller 12 may comprise an image processing circuit for determining whether a target exists in the video stream generated by the video camera 11. The target may be a person, a pet or other object, and can be set by a user via a user interface connected with the auxiliary controller 12. More specifically, the auxiliary controller 12 can comprise a built-in memory or be connected with an external memory for storing contour information corresponding to the target, such as aspect ratio, shape, etc. The auxiliary controller 12 can send an instruction for capturing the video stream (referred as "capturing instruction") to the video camera 11 via the $I^2C$ bus, and then the video camera 11 can send the video stream to the auxiliary controller 12 based on the capturing instruction via the SSI. The auxiliary controller 12 can determine whether a target exists in the video stream based on the contour information. When there is a target existing in the video stream the auxiliary controller 12 can generate a switch instruction and send it to the main controller 13.

The main controller 13, which may be a system on chip (SoC) for example and may comprise an image processing unit, can be electrically connected with the video camera 11 via a digital video pipeline (DVP) and an $I^2C$ bus. The main controller 13 may be configured to switch into a first operation mode from a first standby mode when receiving the switch instruction from the auxiliary controller 12, and then to instruct the auxiliary controller 12 to enter a second standby mode. Herein, the operation mode and the standby mode of the main controller 13 are respectively named the first operation mode and the first standby mode; and the operation mode and the standby mode of the auxiliary controller 12 are respectively named the second operation mode and the second standby mode. In the first operation mode, the main controller 13 obtains the video stream from the video camera 11 to recognize the appearance of the target existing in the video stream. More specifically, the main controller 13 can send an instruction for capturing the video stream to the video camera 11 via the $I^2C$ bus, and then the video camera 11 sends the video stream to the main controller 13 based on the capturing instruction via the DVP, so that the main controller 13 can determine the appearance of the target in the video stream. Moreover, the main controller 13 can comprise a built-in memory or be connected with an external memory for storing various kinds of appearance information corresponding to the target. For example, when the target is set as a person, the main controller 13 can prestore information about male appearance and female appearance, such as the geometric shape and the location of facial features (i.e., ears, eyes, eyebrows, nose and mouth).

As aforementioned, the auxiliary controller 12 in the second operation mode can preliminarily recognize the contour of the object in the video stream, and the main controller 13 in the first operation mode can further analyze the appearance of the object in the video stream. Compared with the main controller 13, the auxiliary controller 12 consumes less power. Moreover, in this embodiment, with the connection between the main controller 13 and the video camera 11 via DVP, and that between the auxiliary controller 12 and the video camera 11 via SSI, the complexity of the circuit may be reduced. However, the video camera 11 can also be connected with these two controllers via universal serial buses (USBs) or other image interfaces, which are not limited in this disclosure.

Figure 2:
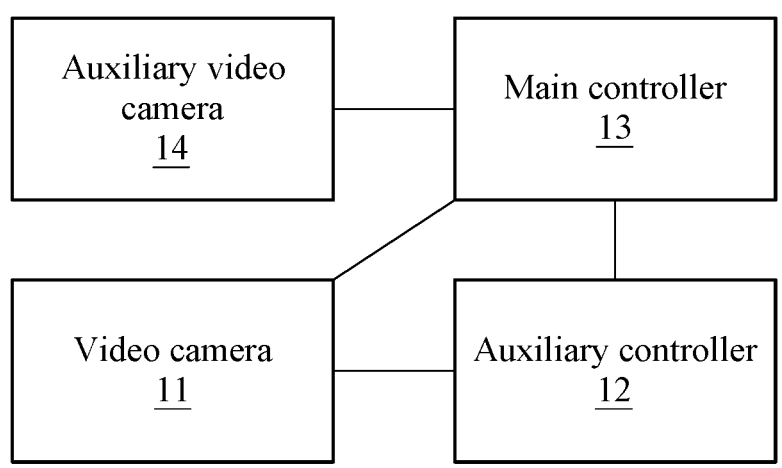
FIG. 2 is a functional block diagram of a video taking device according to another embodiment of this disclosure.

Please refer to FIG. 2 which is a functional block diagram of a video taking device according to another embodiment of this disclosure. In this embodiment, the video taking device 1', similar to the video taking device 1 in FIG. 1, comprises the video camera 11, the auxiliary controller 12 and the main controller 13. For the sake of simplicity, the functions of these components and the connection therebetween are not repeated herein. Besides the above components, the video taking device 1' further comprises an auxiliary video camera 14 electrically connected with the main controller 13 and configured to film to generate an auxiliary video stream for the main controller 13 to enhance one or more features of the appearance of the target. The auxiliary video camera 14, which may be a color camera comprising RGB color filters or CMYK color filters for example, can be configured to film to generate an auxiliary color video stream. The main controller 13 can be connected with the auxiliary video camera 14 via the DVP for capturing the auxiliary video stream from the auxiliary video camera 14, so as to enhance the features of the appearance of the target.

Figure 3:
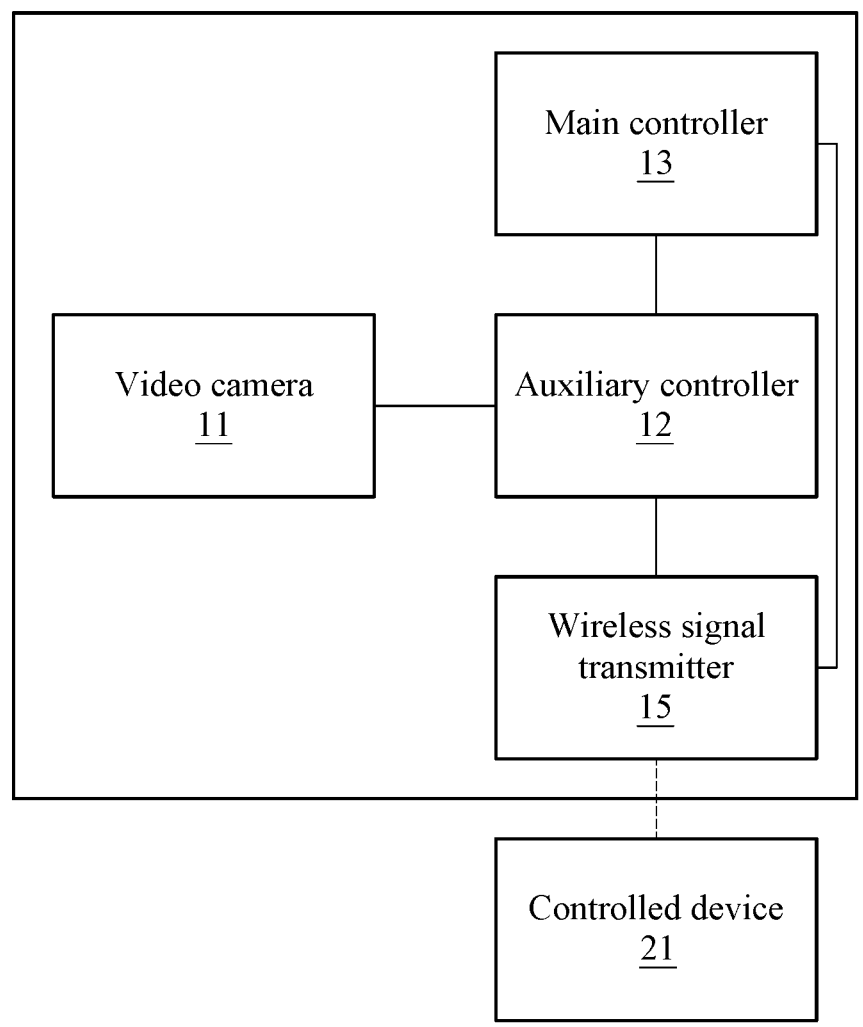
FIG. 3 is a functional block diagram of a video taking device according to yet another embodiment of this disclosure.

Please refer to FIG. 3 which is a functional block diagram of a video taking device according to yet another embodiment of this disclosure. The video taking device 1", similar to the video taking device 1 in FIG. 1, comprises the video camera 11, the auxiliary controller 12 and the main controller 13. For the sake of simplicity, the functions of these components and the connection therebetween are not repeated herein. Besides the above components, the video taking device 1" further comprises a wireless signal transmitter 15 electrically connected with the auxiliary controller 12 and configured to have a communication connection with one or more controlled devices 21. The wireless signal transmitter 15 is for example an infrared, Bluetooth, Wi-Fi or other wireless signal transmitter, and the controlled device 21 is for example a television, air condition, loudspeaker or other device with a wireless signal receiver corresponding to the wireless signal transmitter 15. When the auxiliary controller 12 determines that there is a target existing in the video stream, the auxiliary controller 12 outputs a control instruction via the wireless signal transmitter 15 so as to control the controlled device 21. For example, after setting a gesture representing one (i.e. raising an index finger) as the target, defining the control instruction corresponding to the gesture as an order to enable a loudspeaker, and configuring the loudspeaker as the controlled device 21, when the auxiliary controller 12 determines that there is the gesture representing one in the video stream obtained by the video camera 11, it may send the order to the loudspeaker via the wireless signal transmitter 15 so as to enable the device.

In the above embodiment, the wireless signal transmitter 15 is controlled by the auxiliary controller 12. In another embodiment, the wireless signal transmitter 15 can also be connected with and controlled by the main controller 13. In this embodiment, the contour information of the target is stored in the auxiliary controller 12; and the detailed appearance information, the control instruction and the controlled device which correspond to the target are stored in the main controller 13. After determining that the target exists in the video stream, the auxiliary controller 12 may send the switch instruction to the main controller 13 to wake it up for further image recognizing. And the main controller 13 may send a preset control instruction to the controlled device via the wireless signal transmitter 15 when determining the appearance of the target matches the preset appearance information. In an example, the target is set as a person, the detailed appearance information is set as a grinning face, the control instruction corresponding to the grinning face is set as an order to enable a loudspeaker, and the controlled device 21 is set as the loudspeaker. When determining that there is a contour of a person in the video stream, the auxiliary controller 12 may wake the main controller 13 up to work in the first operation mode. Then, when the main controller 13 determines that the recognized person has a grinning face, the main controller 13 sends the order to the loudspeaker to enable it via the wireless signal transmitter 15. In still yet another embodiment, various targets, a user can set control instructions and controlled devices 21 by the auxiliary controller 12 or/and the main controller 13.

Figure 4:
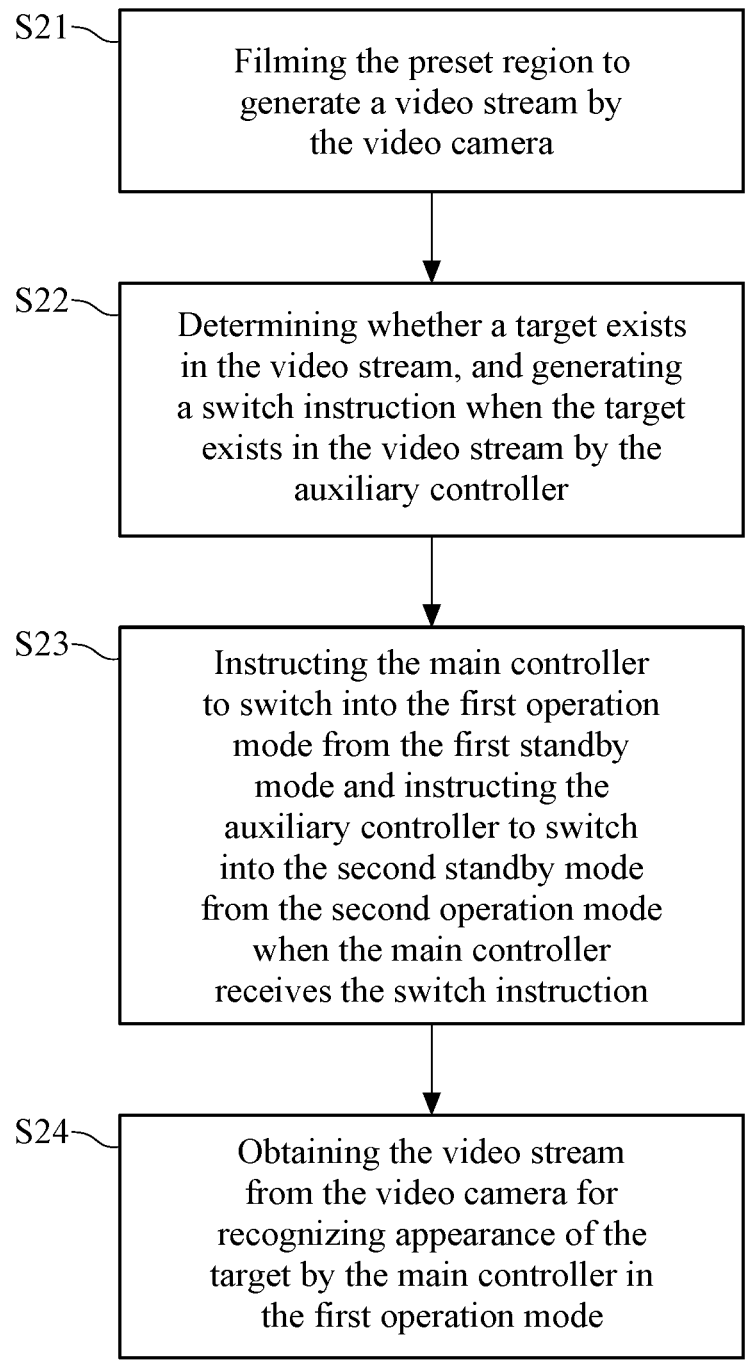
FIG. 4 is a flow chart of an operation method of a video taking device according to an embodiment of this disclosure.
Figure 5:
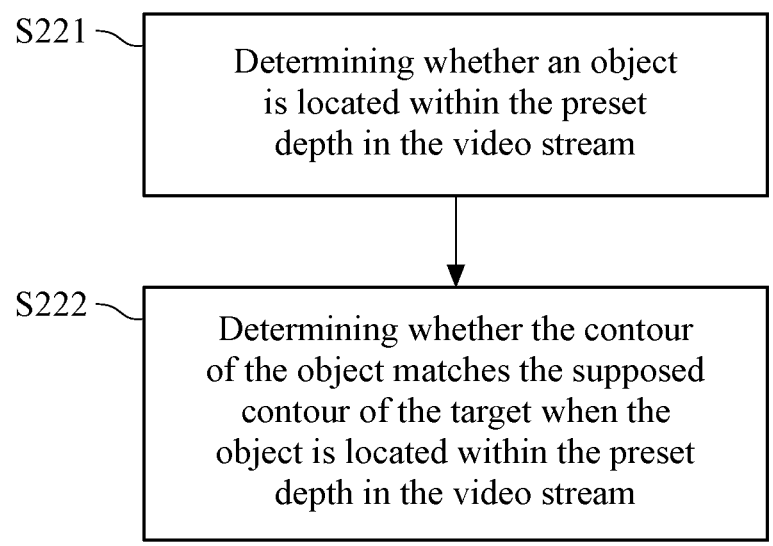
FIG. 5 is a detailed flow chart of an operation method of a video taking device according to an embodiment of this disclosure.

Various architectures of the video taking devices are described in the above embodiments, and the operation methods of the video taking devices are explained in the following. Please refer to FIGS. 1, 4 and 5, wherein FIG. 4 is a flow chart of an operation method of a video taking device according to an embodiment of this disclosure, and FIG. 5 is a detailed flow chart of an operation method of a video taking device according to an embodiment of this disclosure. In step S21 of FIG. 4, the video taking device 1 films a preset region to generate a video stream by the video camera 11. More specifically, the video camera 11 performs filming to generate the video stream including at least one image at a preset (or default) frequency or a frequency set by a user.

In step S22 of FIG. 4, the video taking device 1 determines whether a target exists in the video stream obtained by the video camera 11 with the auxiliary controller 12, and delivers a switch instruction when the target is determined to be existed in the video stream. The target can be set by a user, and can be set as a person, a pet or other objects. In an embodiment, the detailed process of step S22 may comprise steps S221-S222, as shown in FIG. 5. In step S221, the auxiliary controller 12 determines whether an object is located within a preset depth in the video stream. More specifically, as aforementioned, the video camera 11 can be a depth-sensing camera for obtaining images about a preset region and depth distribution information thereof (including distances between the video camera 11 and every object taken by the video camera 11). Therefore, the auxiliary controller 12 can determine whether an object is located within a preset depth in one or more images of the video stream filmed by the video camera 11. In other words, the auxiliary controller 12 can determine whether there is an object in the preset region whose distance from the video camera 11 is equal to/less than a distance corresponding to the preset depth or not. In step S222, when there is an object located within the preset depth, the auxiliary controller 12 may further determine whether the contour of this object located within the preset depth matches the pre-stored contour of the target. More specifically, the auxiliary controller 12 can analyze the contour of the object located within the preset depth, and then determines whether the contour of the object matches the pre-stored contour of the target in the auxiliary controller 12 or the external memory connected with auxiliary controller 12. The auxiliary controller 12 generates the switch instruction and sends it to the main controller 13 after determining that the contour of the object matches the pre-stored contour of the target.

In step S23 of FIG. 4, when the main controller 13 receives the switch instruction from the auxiliary controller 12, the main controller 13 switches into the first operation mode from the first standby mode, and returns another switch instruction to the auxiliary controller 12 to instruct it to switch into the second operation mode from the second standby mode. In step S24, the main controller 13 in the first operation mode obtains the video stream to recognize the appearance of the target. More specifically, the main controller 13 may receive the video stream obtained by the video camera 11 in order to recognize the appearance of the target. As aforementioned, various kinds of appearance information corresponding to the target can be prestored in the main controller 13. Therefore, the main controller 13 can classify the recognized the appearance of the target based on the prestored appearance information. For example, after the appearance information about female and appearance information about male are prestored in the main controller 13, the main controller 13 can determines the target is a female or a male based on the recognized appearance of the target and the prestored appearance information.

Figure 6:
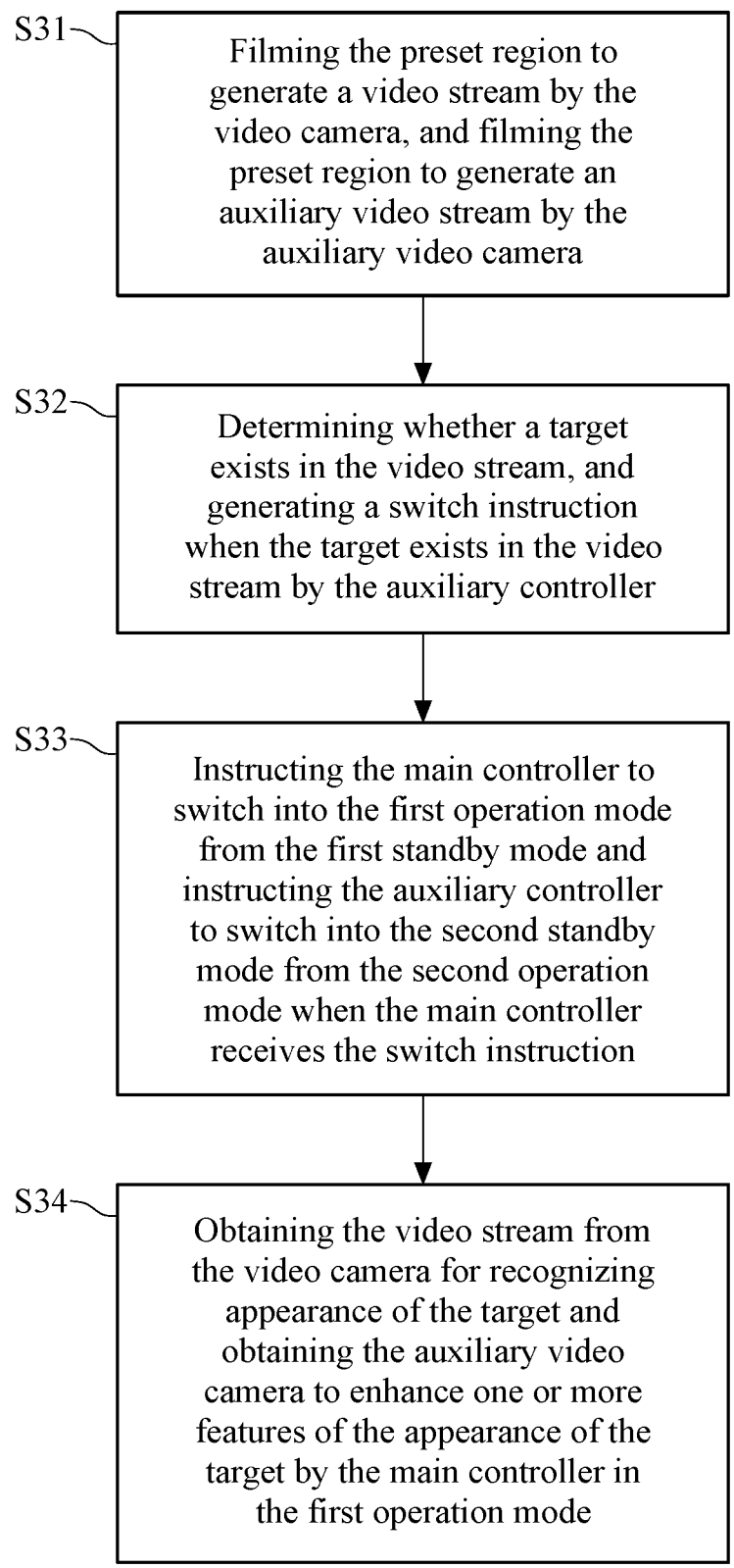
FIG. 6 is a flow chart of an operation method of a video taking device according to another embodiment of this disclosure.

In another embodiment, please refer to FIGS. 2, 5 and 6, wherein FIG. 6 is a flow chart of an operation method of a video taking device according to another embodiment of this disclosure. This operation method is applied to the video taking device 1' comprising the auxiliary video camera 14 as shown in FIG. 2. In step S31, the video taking device 1' obtains a video stream of a preset region with the video camera 11, and an auxiliary video stream of the preset region with the auxiliary video camera 14. More specifically, the video camera 11 and the auxiliary video camera 14 may work at a same frequency or different frequencies to generate the video stream having at least one image and the auxiliary video stream having at least one auxiliary image, wherein the auxiliary image may contain color information.

In steps S32-S33, the video taking device 1' determines whether a target exists in the video stream acquired by the video camera 11 with the auxiliary controller 12, and outputs a switch instruction after determining that the target exists in the video stream. When the main controller 13 receives the switch instruction from the auxiliary controller 12, the main controller 13 switches into the first operation mode from the first standby mode, and returns another switch instruction to the auxiliary controller 12 so as to instruct the auxiliary controller 12 to enter into the second standby mode. The details of these steps, which are similar to those of the steps S22-S23 in FIG. 5, are not repeated here.

In step S34, the main controller 13 in the first operation mode obtains the video stream to recognize the appearance of the target. Similar to the detailed description of the step S24 in FIG. 4, the main controller 13 may receive the video stream generated by the video camera 11 in order to identify the appearance of the target. In addition, the main controller 13 may receive the auxiliary video stream from the auxiliary video camera 14 in order to further enhance one or more features of the appearance of the target. More specifically, the auxiliary video stream and the video stream are about the same preset region, which means when there is a target existed in the video stream, the target also exists in the auxiliary video stream. The main controller 13 can enhance one or more features of the appearance of the target based on the colour information of one or more auxiliary images of the auxiliary video stream. In other words, the main controller 13 can obtain the colour information of the target based on the auxiliary video stream. For example, when the target is set as a person, the main controller 13 can, based on the auxiliary video stream, determines that the person taken by the video camera 11 is of the yellow, white, or black race.

In particular, the step of filming to generate the auxiliary video stream by the auxiliary video camera 14 is not limited to be performed in the step S31. In another embodiment, this step can be performed when the main controller is in the first operation mode. More specifically, when the auxiliary controller 12 wakes the main controller 13 up after determining that there is a target existed in the video stream, the main controller 13 controls the auxiliary video camera 14 to film and return taken video streams to the main controller 13 for analysis.

In yet another embodiment, the method for operating the video taking device described in the above embodiments may further comprise: for the main controller 13 in the first operation mode, after determining that there is no target existed in the video stream for a preset time interval, the main controller 13 sends a second switch instruction to the auxiliary controller 12 to instruct the auxiliary controller 12 to switch into the second operation mode from the second standby mode. At this time, the auxiliary controller 12 returns another second switch instruction to the main controller 13 to instruct it to switch into the first standby mode from the first operation mode. The above preset time interval can be set as 30 minutes, 1 hour or other time interval designed according to actual requirements, which is not limited in this disclosure.

In view of the above description, the video taking device of this disclosure provides a preliminary image recognition mode having low power consumption by the disposition of the auxiliary controller. In this case, the main controller is in the standby mode until the auxiliary controller preliminarily detects the target. At this time, the main controller enters an advanced image recognition mode. The video taking device provided in this disclosure may allow the main controller not to be in high-speed operation through switching between the above two kinds of recognition modes, so as to reduce the power consumption and heat production during the operation.

What is claimed is:

1. A video taking device, comprising:
   a video camera configured to film to generate a video stream;
   an auxiliary controller electrically connected with the video camera, and configured to determine whether a target exists in the video stream, and to generate a switch instruction after determining that the target exists in the video stream; and
   a main controller electrically connected with the video camera and the auxiliary controller, wherein when the main controller receives the switch instruction, the main controller switches into a first operation mode from a first standby mode and returns another switch instruction to the auxiliary controller so as to instruct the auxiliary controller to enter into a second standby mode, and to obtain the video stream from the video camera for recognizing appearance of the target.

2. The video taking device according to claim 1, further comprising an auxiliary video camera which is electrically connected with the main controller and configured to film to generate an auxiliary video stream for the main controller to enhance one or more features of the appearance of the target.

3. The video taking device according to claim 2, wherein the auxiliary video camera comprises a color camera.

4. The video taking device according to claim 1, wherein the video camera comprises a depth-sensing camera.

5. The video taking device according to claim 1, further comprising a wireless signal transmitter electrically connected with the auxiliary controller, wherein the auxiliary controller is further configured to output a control instruction via the wireless signal transmitter for controlling a controlled device having a wireless signal receiver when the target exists in the video stream.

6. An operation method applied to a video taking device comprising a video camera, an auxiliary controller and a main controller, and the operation method comprising:
   filming a preset region to generate a video stream by the video camera;
   determining whether a target exists in the video stream and generating a switch instruction by the auxiliary controller when the target exists in the video stream;
   instructing the main controller to switch into a first operation mode from a first standby mode and to return another switch instruction to the auxiliary controller so as to instruct the auxiliary controller to switch into a second standby mode from a second operation mode when the main controller receives the switch instruction; and
   obtaining the video stream from the video camera for recognizing appearance of the target by the main controller in the first operation mode.

7. The operation method according to claim 6, wherein the video camera comprises a depth-sensing camera, and determining whether the target exists in the video stream by the auxiliary controller comprises:
   determining whether an object is located within a preset depth in the video stream; and
   determining whether a contour of the object matches a contour of the target when the object is located within the preset depth in the video stream.

8. The operation method according to claim 6, further comprising filming the preset region to generate an auxiliary video stream by an auxiliary video camera, and obtaining the auxiliary video camera to enhance one or more features of the appearance of the target by the main controller in the first operation mode.

9. The operation method according to claim 6, further comprising outputting a second switch instruction to the auxiliary controller by the main controller when the main controller is in the first operation mode and there is no target existing in the video stream for a preset time interval, so as to instruct the auxiliary controller to switch into the second operation mode from the second standby mode, and to instruct the main controller to switch into the first standby mode from the first operation mode.

10. The operation method according to claim 6, further comprising outputting a control instruction by a wireless signal transmitter for controlling a controlled device having a wireless signal receiver when the target exists in the video stream.

* * * * *